United States Patent
Chauvet et al.

(10) Patent No.: US 10,628,402 B2
(45) Date of Patent: Apr. 21, 2020

(54) FULL DATA SET AVOIDANCE

(71) Applicant: International Business Machines Corporation, Armonk, NY (US)

(72) Inventors: Philip R. Chauvet, Tucson, AZ (US); David C. Reed, Tucson, AZ (US); Michael R. Scott, Ocean View, HI (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 15/717,814

(22) Filed: Sep. 27, 2017

(65) Prior Publication Data
US 2019/0095473 A1    Mar. 28, 2019

(51) Int. Cl.
*G06F 16/22* (2019.01)
*H04L 29/08* (2006.01)
*G06F 16/23* (2019.01)

(52) U.S. Cl.
CPC ...... *G06F 16/2272* (2019.01); *G06F 16/2365* (2019.01); *G06F 16/2379* (2019.01); *H04L 67/1097* (2013.01)

(58) Field of Classification Search
CPC ............. G06F 16/2272; G06F 16/2379; G06F 16/2365; G06F 16/13; G06F 16/1727; G06F 16/188; G06F 16/2228; G06F 16/2246; G06F 16/23; G06F 16/2255; G06F 16/325; G06F 16/134; G06F 16/17; G06F 16/2282; G06F 16/901; G06F 11/2023; H04L 67/1097

USPC ........................................................ 707/696
See application file for complete search history.

(56) References Cited

U.S. PATENT DOCUMENTS

| | | | |
|---|---|---|---|
| 4,855,907 A * | 8/1989 | Ferro, Jr. ............ | G06F 16/9017 |
| 5,265,244 A * | 11/1993 | Ghosh ................. | G06F 16/9024 |
| 5,517,641 A * | 5/1996 | Barry ....................... | G06F 7/22 |
| 5,933,820 A * | 8/1999 | Beier .................. | G06F 16/2282 |
| 7,228,309 B1 * | 6/2007 | Fisher ................. | G06F 16/2228 |
| 2003/0046294 A1 * | 3/2003 | Heronimus ......... | G06F 16/2282 |
| 2007/0078909 A1 * | 4/2007 | Tamatsu ............... | G06F 16/221 |
| 2007/0088769 A1 | 4/2007 | Pace et al. | |
| 2012/0078922 A1 | 3/2012 | Masser et al. | |
| 2016/0070721 A1 | 3/2016 | Menendez et al. | |
| 2016/0253353 A1 * | 9/2016 | Benjamin-Deckert | ..................... G06F 16/1774 707/704 |

\* cited by examiner

*Primary Examiner* — Evan Aspinwall
(74) *Attorney, Agent, or Firm* — Nelson and Nelson; Daniel P. Nelson; Alexis V. Nelson (57) ABSTRACT

A method includes receiving a request to store a record in a base data set and determining whether the base data set can accommodate the record. In the event the base data set cannot accommodate the record, the method automatically creates an overflow data set to accommodate the record, stores the record in the overflow data set, and updates an index of the base data set to include a key associated with the record. The key points to the overflow data set as containing the record. In certain embodiments, the base data set and overflow data set are both keyed VSAM data sets. A corresponding system and computer program product are also disclosed.

20 Claims, 7 Drawing Sheets

FULL DATA SET AVOIDANCE

BACKGROUND

Field of the Invention

This invention relates to systems and methods for avoiding adverse consequences associated with full data sets.

Background of the Invention

Currently, when a user allocates data sets on operating systems such as z/OS, the operating system may require the user to specify a primary and secondary allocation amount. The primary allocation amount is the amount of storage space the data set is assigned on the first extent of the volume it resides on. The secondary allocation amount is the amount of storage space that subsequent extensions of the data set receive. The data set may generally only expand by the secondary allocation amount a selected number of times before the data set is considered full and unable to receive additional data. A user may select primary and secondary allocation amounts based on how the user anticipates the data set will be used and grow over time.

In some cases, a data set that is full may result in undesirable and potentially severe consequences. For example, many applications use control data sets to maintain key information about product-specific metadata stored on direct-access storage devices (DASD), such as disk drives or solid state drives. These control data sets may be keyed Virtual Storage Access Method (VSAM) data sets in many cases. One example of such an application is one that maintains inventory information about backup versions of data and where the backup versions are stored. When a control data set fills up with data and is unable to expand further, the application may need to be taken down to reorganize the control data set and move records into a newly allocated larger control data set. This may cause an outage during the reorganization process. Depending on the criticality of the application and the timing of the outage, the impact may be severe.

In view of the foregoing, what are needed are systems and methods to avoid situations where data sets become full and are unable to receive additional data. Ideally, such systems and methods will enable a data set to be temporarily over-allocated with storage space until the data set can be reorganized. Ideally, this will enable an associated application to be taken down at a time that is convenient and with minimal impact.

SUMMARY

The invention has been developed in response to the present state of the art and, in particular, in response to the problems and needs in the art that have not yet been fully solved by currently available systems and methods. Accordingly, the invention has been developed to provide systems and methods to avoid adverse consequences associated with full data sets. The features and advantages of the invention will become more fully apparent from the following description and appended claims, or may be learned by practice of the invention as set forth hereinafter.

Consistent with the foregoing, a method for avoiding adverse consequences associated with full data sets is disclosed. In one embodiment, such a method includes receiving a request to store a record in a base data set and determining whether the base data set can accommodate the record. In the event the base data set cannot accommodate the record, the method automatically creates an overflow data set to accommodate the record, stores the record in the overflow data set, and updates an index of the base data set to include a key associated with the record. The key points to the overflow data set as containing the record. In certain embodiments, the base data set and overflow data set are both keyed VSAM data sets.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
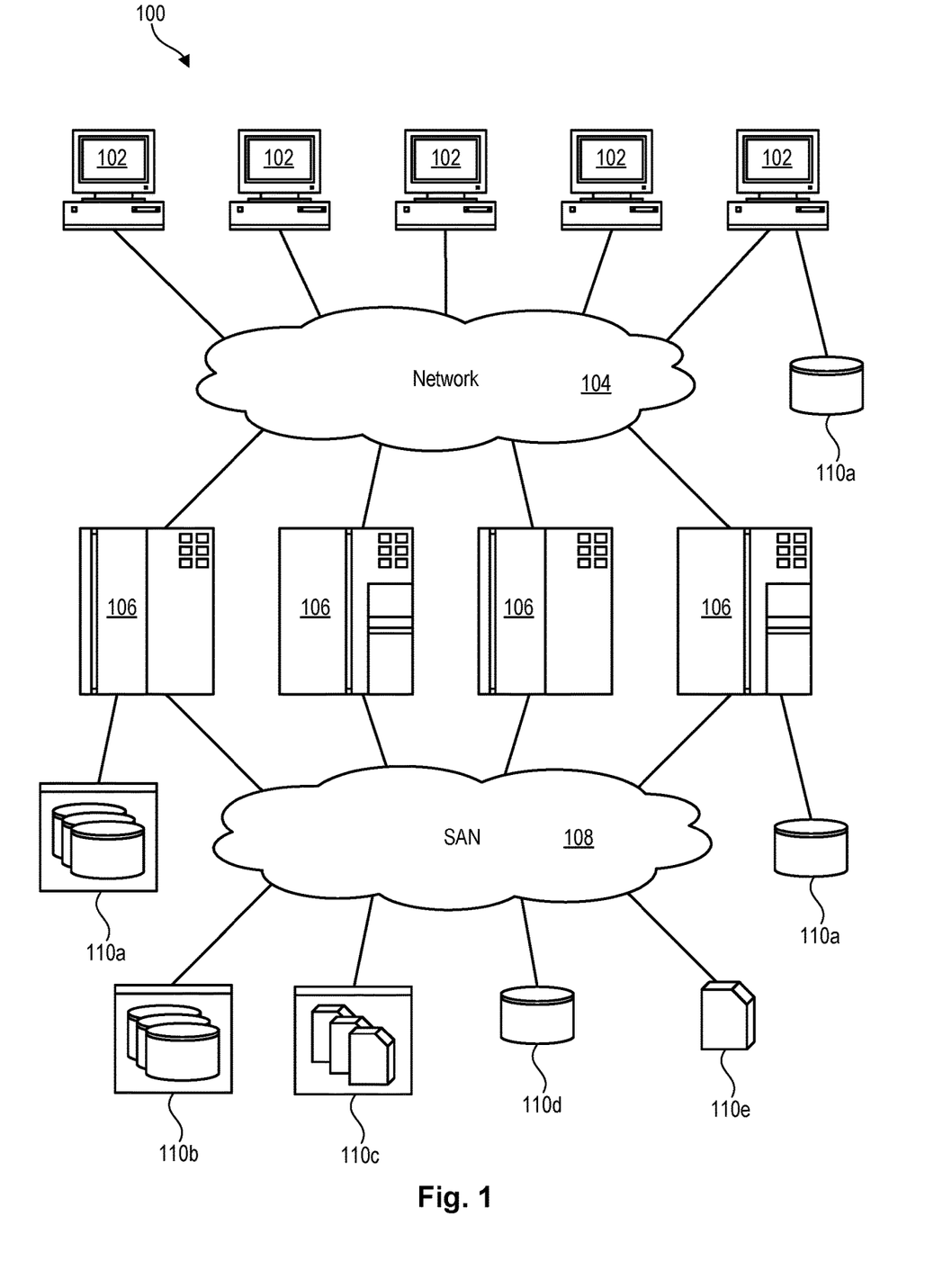
FIG. 1 is a high-level block diagram showing one example of a network environment in which systems and methods in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
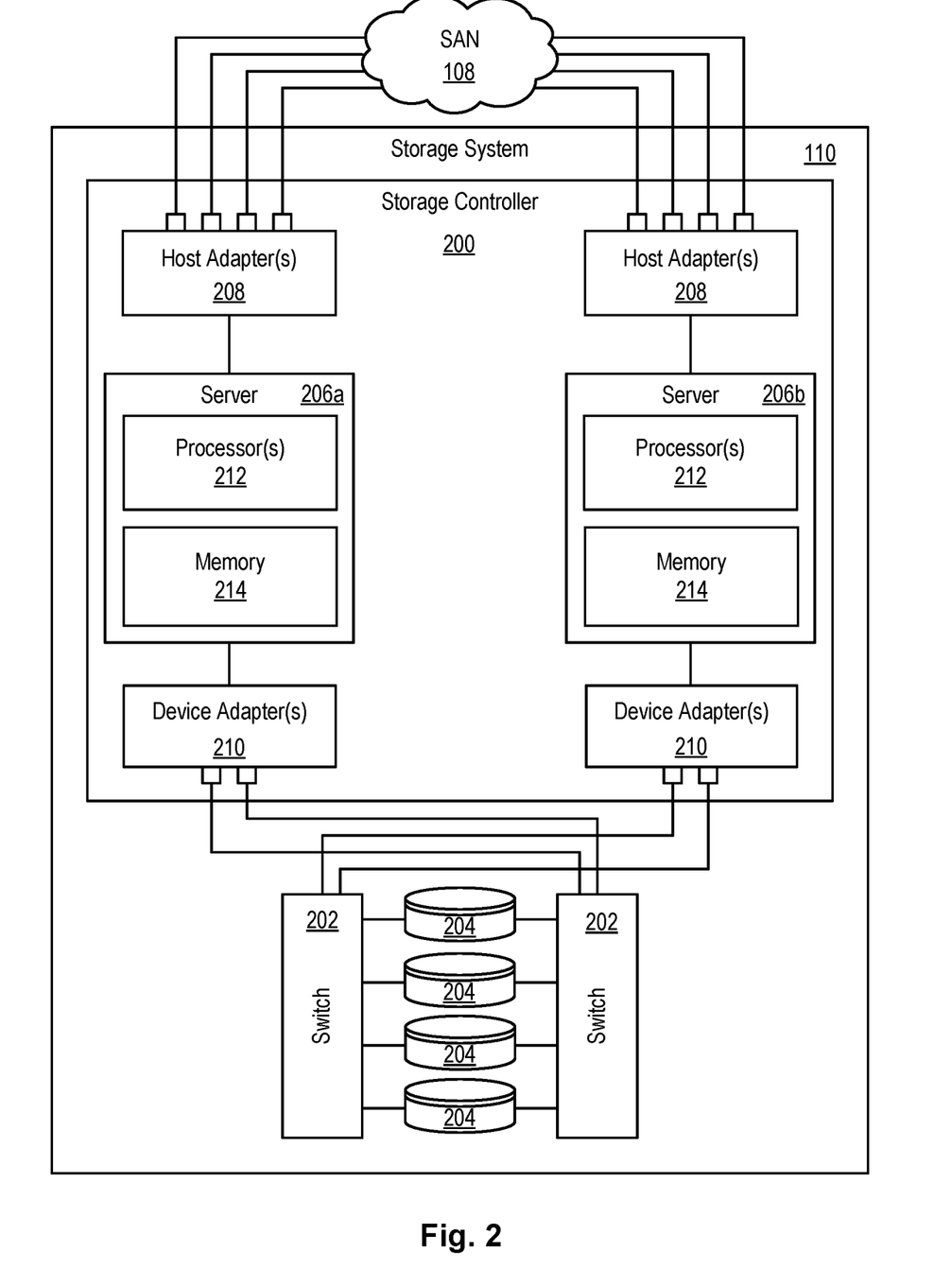
FIG. 2 is a high-level block diagram showing one example of a storage system in the network environment.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such as z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
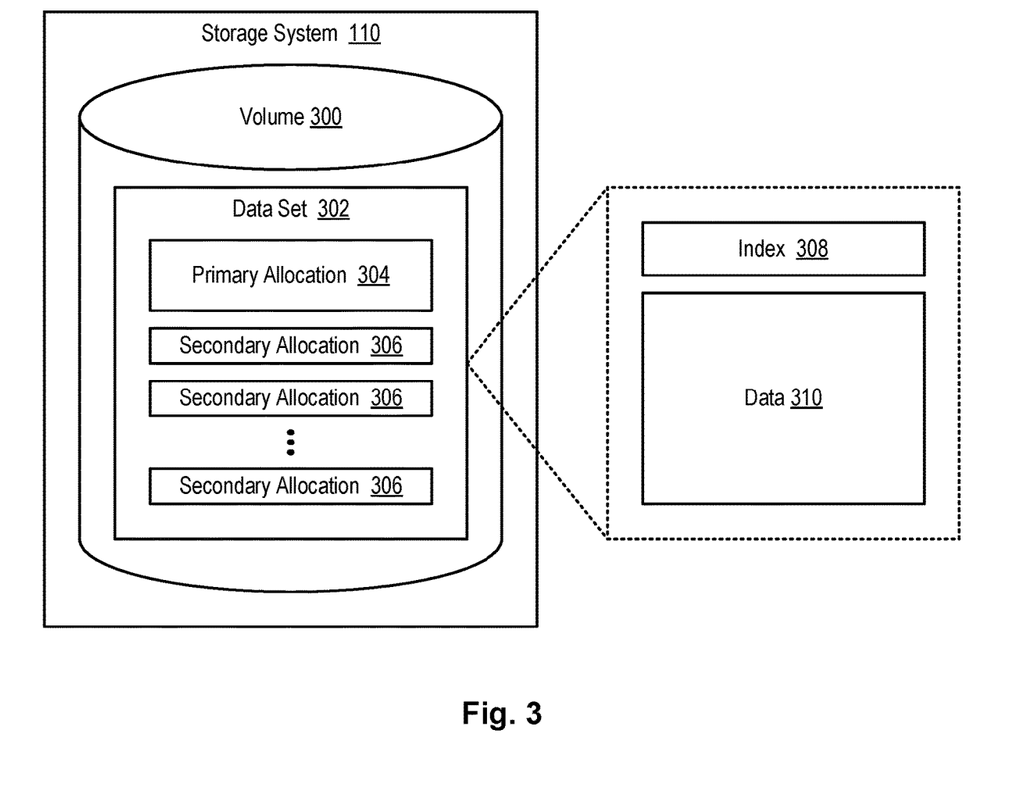
FIG. 3 is a high-level block diagram showing a base data set stored in a volume of a storage system.

Referring to FIG. 3, storage space on the storage drives 204 (as illustrated in FIG. 2) may be logically divided into one or more volumes 300. These volumes 300 may, in turn, be used to store one or more data sets 302 (i.e., files 302 containing one or more records, where a record is a basic unit of information used by a program running on an operating system such as z/OS). Currently, when a user allocates data sets 302 on operating systems such as z/OS, the operating system may require the user to specify a primary and secondary allocation amount. The primary allocation amount is the amount of storage space the data set 302 is assigned on the first extent of the volume 300 it resides on. The secondary allocation amount is the amount of storage space that subsequent extensions of the data set 302 receive. The data set 302 may generally only expand by the secondary allocation amount a selected number of times before the data set 302 is considered full and unable to receive additional data. A user may select primary and secondary allocation amounts based on how the user anticipates the data set 302 will be used and grow over time. FIG. 3 shows a data set 302 comprising storage space made up of a primary allocation 304 and a certain number of secondary allocations 306. As further shown in FIG. 3, the primary and secondary allocations 304, 306 may be used to store an index component 308 and a data component 310 associated with the data set 302.

Figure 4:
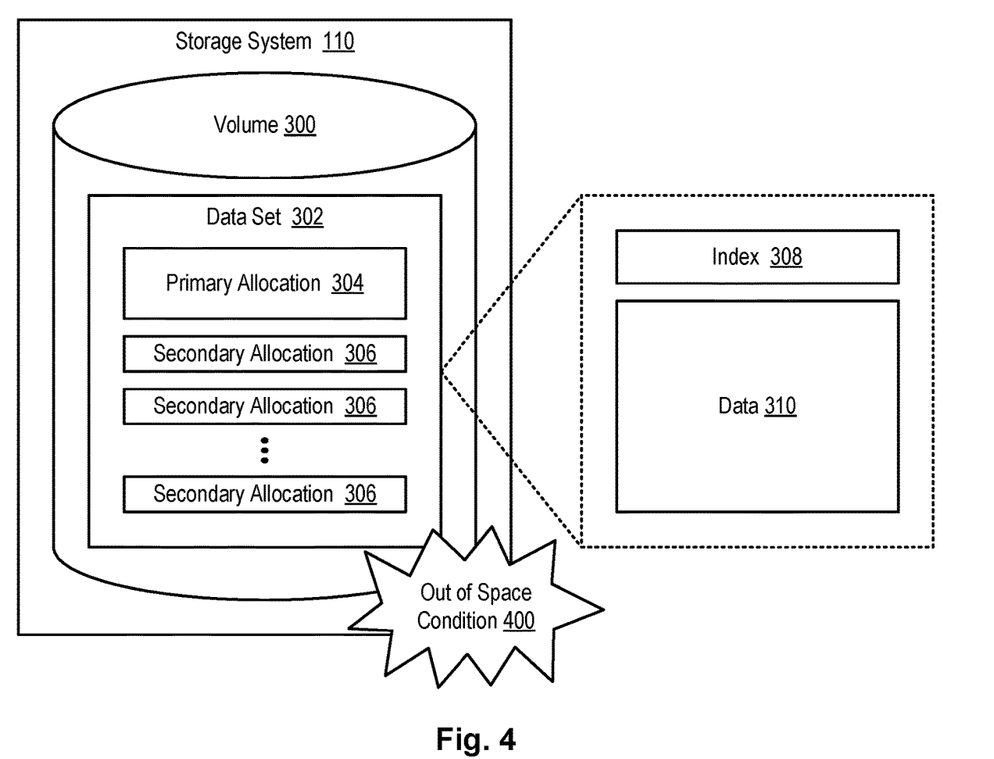
FIG. 4 is a high-level block diagram showing the base data set experiencing an out-of-space condition.

Referring to FIG. 4, when a data set 302 has expanded by a maximum number of secondary allocations 306 and cannot expand further, the data set 302 may be full and experience an out-of-space condition 400. As previously mentioned, a data set 302 that is full may result in undesirable and potentially severe consequences. For example, some applications use control data sets 302 to maintain key information about product-specific metadata stored on direct-access storage devices (DASD), such as disk drives 204 or solid state drives 204. These control data sets 302 may in certain embodiments be keyed Virtual Storage Access Method (VSAM) data sets 302. An example of such an application is an application that maintains inventory information about backup versions of data and where the backup versions are stored. When a control data set 302 fills up with data and is unable to expand further, the application may need to be taken down to reorganize the control data set 302 and move records into a newly allocated larger control data set 302. This may cause an outage during the reorganization process. Depending on the criticality of the application and the timing of the outage, the impact may be severe.

When a request is made to place a record into the data set 302, and more specifically into the data component 310 of the data set 302, where the record is placed within the data set 302 may depend on where other records with similar key values are located within the data set 302. If that area does not have room to accommodate the record, a split may take place within the data set 302. This split may move half the records to another Control Interval (block) within a same Control Area (generally 1 cylinder) of the data set 302. If the control area has no more room, then a new control area may be used. If the data set 302 does not have any empty control areas, the data set 302 may be extended by the secondary allocation amount to add more space. If the data set 302 cannot extend because it has reached a maximum number of extends or used up all space on the eligible volume 300 or volumes 300, then the write request may fail. The user may then have to reorganize the data set 302 by moving all records into a newly allocated version of the data set 302.

In view of the foregoing, what are needed are systems to avoid situations where data sets 302 become full and are unable to receive additional data. Ideally, such systems and methods will enable a data set 302 to be over-allocated with storage space until the data set can be reorganized. Ideally, this will enable an associated application to be taken down at a time that is convenient and with minimal impact. One such system and method is disclosed in FIGS. 5 through 7.

Figure 5:
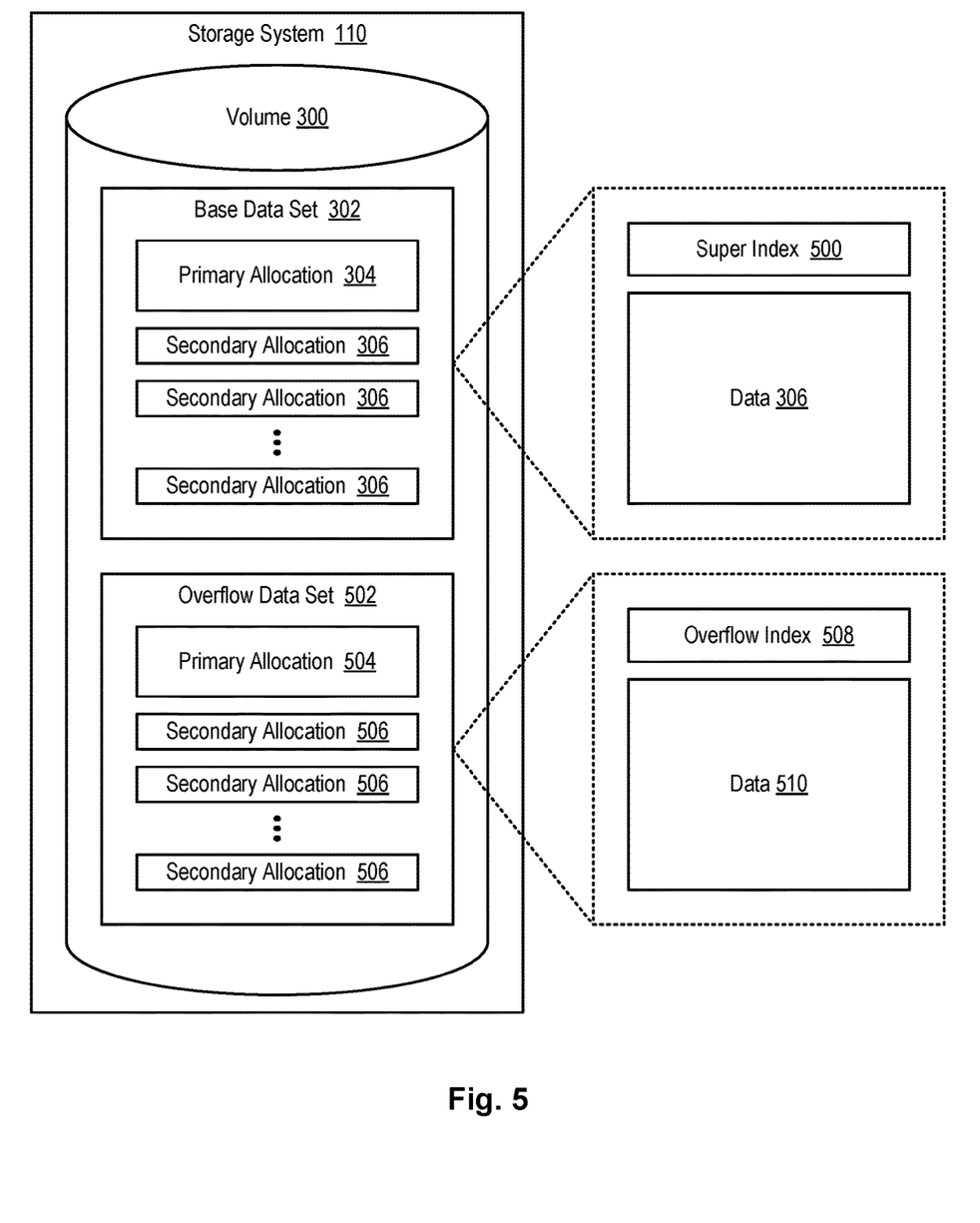
FIG. 5 is a high-level block diagram showing creation of an overflow data set to store records that cannot be accommodated by the base data set.

Referring to FIG. 5, in certain embodiments in accordance with the invention, a data set 302 may be configured to avoid adverse consequences associated with becoming full. In certain embodiments, a new data set attribute may be added to a base data set 302 that enables temporary over allocations to the base data set 302. This attribute may be set at data set definition time, or tuned off/on via an alter command. When a base data set 302 runs out of space or experiences an out-of-space condition 400, the attribute may be checked to determine whether the base data set 302 supports temporary allocations. If so, an overflow data set 502 may be allocated on either the same or a different volume 300 as the base data set 302. This overflow data set 502 may include its own index 508 and data component 510. The overflow data set 502, like the base data set 302, may initially be allocated a primary allocation 504 and expand by a secondary allocation 506, as shown in FIG. 5.

From the outside, the base data set 302 and overflow data set 502 may look like different data sets. However, a new super index 500 (replacing or augmenting the previous index 308) may be used to link the base data set 302 to the overflow data set 502 and keep track of which records belong to which data set 302, 502. In certain embodiments, the overflow data set 502 may not be accessible other than through the base data set 302 via the data set attribute that is checked during open processing.

The super index 500 may in certain embodiments be similar to the previous index 308 but with some changes. When initially created, the super index 500 may exclusively refer to records in the base data set 302. The previous index 308 may contain pointers to a high key in each control interval within a data control area. When the super index 500 is created and initialized, these pointers may remain in the super index 500. However, if a new key references a record in the overflow data set 502, rather than a record in the base data set 302, the super index 500 may simply indicate that the overflow index 508 needs to be referenced for that key. The overflow index 508 may contain its own index structure with key values and pointers to records in the overflow data set 502.

As new records are received by the base data set 302, they will be placed into either the base data set 302 or overflow data set 502. If there is space in the base data set 302 where a records need to be inserted based on its key value, the record may be inserted into the base data set 302. If the insert will cause a control interval split or the record belongs to a control interval that has been added to the overflow data set 502, then the record may be placed in the overflow data set 502. In either case, the super index 500 may be updated but the overflow index 508 may only be updated if the record is added to the overflow data set 502.

For read requests, the super index 500 may be initially searched. If the record is in the base data set 302, the super index 500 will reference the record's location in the base data set 302. If the record is in the overflow data set 502, the read request may be forwarded to the overflow data set 502 and the overflow index 508 may be referenced to find and obtain the record in the overflow data set 502.

When the base data set 302 and overflow data set 502 are eventually reorganized, the records from the two data sets may be merged into a single data set. In certain embodiments, record keys are read in ascending order from each data set 302, 502 and placed into the new data set in that order until all of the keys have been read. At this point, the data is once again consolidated in a single data set (e.g., keyed VSAM data set). To encourage users to merge records from a base data set 302 and overflow data set 502 into a single data set, a warning message may be issued at open time if an overflow data set 502 associated with a base data set 302 exists.

Figure 6:
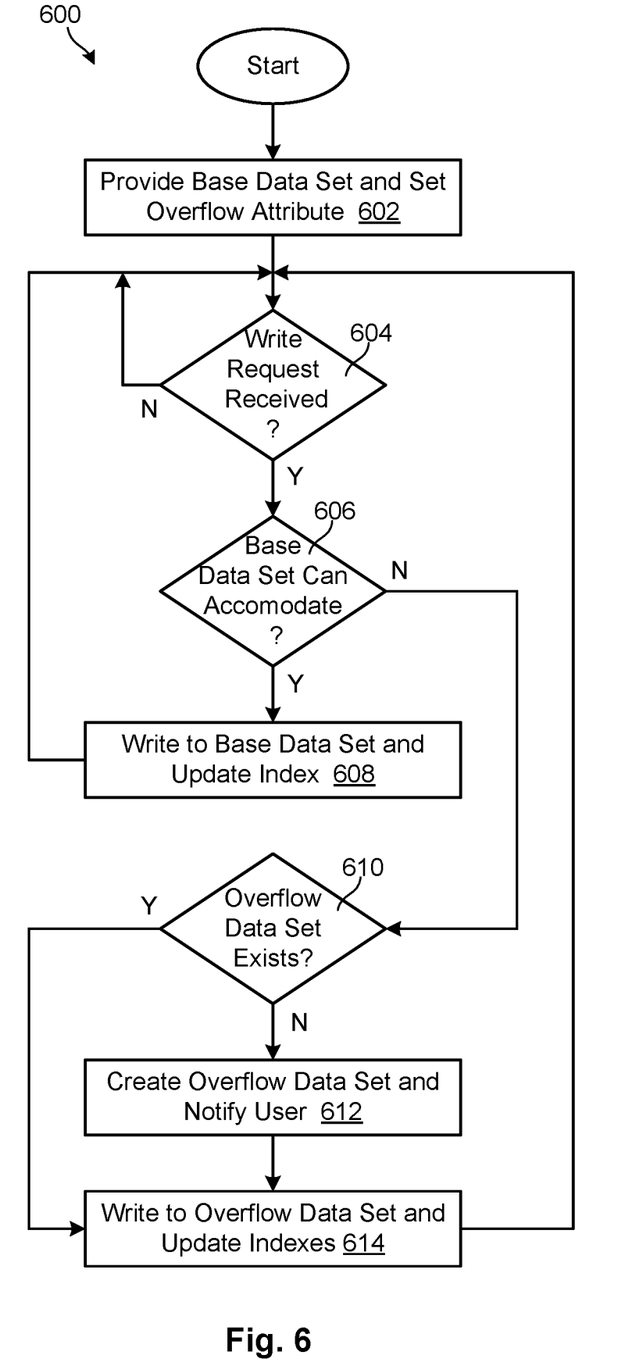
FIG. 6 is a process flow diagram showing one embodiment of a method for creating and utilizing an overflow data set in association with a base data set.

Referring to FIG. 6, one embodiment of a method 600 for creating and utilizing an overflow data set 502 is illustrated. As shown, the method 600 initially provides 602 a base data set 302 and sets 602 an overflow attribute associated with the base data set 302. The overflow attribute may enable temporary over allocations to the base data set 302. When a write request is received 604 by the base data set 302, the method 600 determines 606 whether the base data set 302 can accommodate the record. If so, the method 600 stores 608 the record in the base data set 302 and updates the index (308 or 500) associated with the base data set 302 with a key that references the record.

If the base data set 302 cannot accommodate the record, the method 600 determines 610 whether an overflow data set 502 exists in association with the base data set 302. If so, the method 600 stores 614 the record in the overflow data set 502 and updates 614 the indexes 500, 508 associated with the base data set 302 and overflow data set 502 to reference the record. If an overflow data set 502 does not exist, the method 600 creates 612 the overflow data set 502 and notifies 612 a user that the overflow data set 502 has been created and that a future reorganization (i.e., merging of data sets) may be required. The method 600 may then store 614 the record in the newly created overflow data set 502 and update 614 the indexes 500, 508 associated with the base data set 302 and overflow data set 502 to reference the record.

Figure 7:
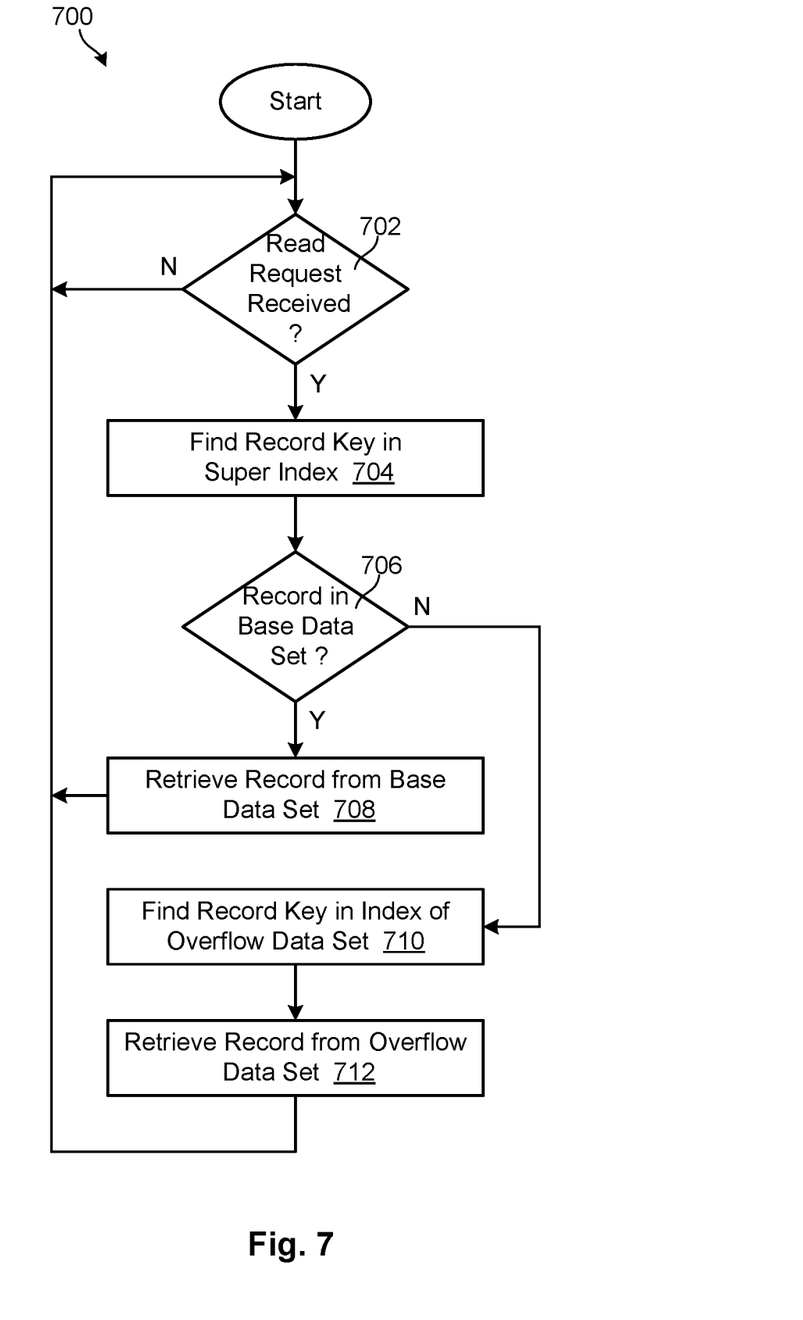
FIG. 7 is a process flow diagram showing one embodiment of a method for accessing records in a base data set and associated overflow data set.

Referring to FIG. 7, one embodiment of a method 700 for accessing data in a base data set 302 and associated overflow data set 502 is illustrated. As shown, the method 700 initially determines 702 whether a read request has been received. If so, the method 700 finds 704 the record key in the super index 500 of the base data set 302. If the super index 500 indicates 706 that the record is in the base data set 302, the method 700 retrieves 708 the record from the base data set 302 at the location indicated in the super index 500. If the record is not in the base data set 302, the method 700 finds 710 the record key in the index 508 of the overflow data set 502 and retrieves the record from the overflow data set 502 at the specified location.

In certain embodiments, once a overflow data set 502 is full or cannot accommodate an additional record, additional overflow data sets 502 may be created to accommodate additional data. This process may occur until data is reorganized and merged into a single data set 302. Thus, systems and methods in accordance with the invention are not limited to creation of a single overflow data set 502.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for avoiding adverse consequences associated with full data sets, the method comprising:

receiving a request to store a record in a base data set stored on a volume of a storage system, the base data set having a first index, a first primary allocation amount, and a first secondary allocation amount associated therewith;

determining whether the base data set can accommodate the record; and in the event the base data set cannot accommodate the record, automatically performing the following:

create, on a volume of a storage system, an overflow data set to accommodate the record, the overflow data set having a second index, a second primary allocation amount, and a second secondary allocation amount associated therewith;

store the record in the overflow data set; and update the first index to include a key associated with the record, the key pointing to the overflow data set as containing the record.

2. The method of claim 1, upon receiving a request to access the record, finding the key in the first index.

3. The method of claim 2, upon finding the key in the first index, directing the request to the overflow data set.

4. The method of claim 3, upon directing the request to the overflow data set, finding the key in the second index and determining a location of the record in the overflow data set.

5. The method of claim 4, upon determining the location of the record in the overflow data set, retrieving the record from the overflow data set.

6. The method of claim 1, wherein both the base data set and overflow data set are keyed VSAM data sets.

7. The method of claim 1, further comprising, prior to creating the overflow data set, checking whether the base data set supports expansion by way of overflow data sets.

8. A computer program product to avoid adverse consequences associated with full data sets, the computer program product comprising a non-transitory computer-readable storage medium having computer-usable program code embodied therein, the computer-usable program code configured to perform the following when executed by at least one processor:

receive a request to store a record in a base data set stored on a volume of a storage system, the base data set having a first index, a first primary allocation amount, and a first secondary allocation amount associated therewith;

determine whether the base data set can accommodate the record; and in the event the base data set cannot accommodate the record, automatically perform the following:

create, on a volume of a storage system, an overflow data set to accommodate the record, the overflow data set having a second index, a second primary allocation amount, and a second secondary allocation amount associated therewith;

store the record in the overflow data set; and update the first index to include a key associated with the record, the key pointing to the overflow data set as containing the record.

9. The computer program product of claim 8, wherein the computer-usable program code is further configured to, upon receiving a request to access the record, find the key in the first index.

10. The computer program product of claim 9, wherein the computer-usable program code is further configured to, upon finding the key in the first index, direct the request to the overflow data set.

11. The computer program product of claim 10, wherein the computer-usable program code is further configured to, upon directing the request to the overflow data set, find the key in the second index and determine a location of the record in the overflow data set.

12. The computer program product of claim 11, wherein the computer-usable program code is further configured to, upon determining the location of the record in the overflow data set, retrieve the record from the overflow data set.

13. The computer program product of claim 8, wherein both the base data set and overflow data set are keyed VSAM data sets.

14. The computer program product of claim 8, wherein the computer-usable program code is further configured to, prior to creating the overflow data set, check whether the base data set supports expansion by way of overflow data sets.

15. A system for avoiding adverse consequences associated with full data sets, the system comprising:

at least one processor;

at least one memory device operably coupled to the at least one processor and storing instructions for execution on the at least one processor, the instructions causing the at least one processor to:

receive a request to store a record in a base data set stored on a volume of a storage system, the base data set having a first index, a first primary allocation amount, and a first secondary allocation amount associated therewith;

determine whether the base data set can accommodate the record; and in the event the base data set cannot accommodate the record, automatically perform the following:

create, on a volume of a storage system, an overflow data set to accommodate the record, the overflow data set having a second index, a second primary allocation amount, and a second secondary allocation amount associated therewith;

store the record in the overflow data set; and update the first index to include a key associated with the record, the key pointing to the overflow data set as containing the record.

16. The system of claim 15, wherein the instructions further cause the at least one processor to, upon receiving a request to access the record, find the key in the first index.

17. The system of claim 16, wherein the instructions further cause the at least one processor to, upon finding the key in the first index, direct the request to the overflow data set.

18. The system of claim 17, wherein the instructions further cause the at least one processor to, upon directing the request to the overflow data set, find the key in the second index and determine a location of the record in the overflow data set.

19. The system of claim 18, wherein the instructions further cause the at least one processor to, upon determining the location of the record in the overflow data set, retrieve the record from the overflow data set.

20. The system of claim 15, wherein the instructions further cause the at least one processor to, prior to creating the overflow data set, check whether the base data set supports expansion by way of overflow data sets.

* * * * *